United States Patent
Hufnagel et al.

(10) Patent No.: US 11,698,641 B2
(45) Date of Patent: Jul. 11, 2023

(54) DYNAMIC LIDAR ALIGNMENT

(71) Applicant: GM GLOBAL TECHNOLOGY OPERATIONS LLC, Detroit, MI (US)

(72) Inventors: Brian J. Hufnagel, Brighton, MI (US); Robert D. Sims, III, Milford, MI (US); Nathaniel W. Hart, Beverly Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 796 days.

(21) Appl. No.: 16/395,313

(22) Filed: Apr. 26, 2019

(65) Prior Publication Data

US 2020/0341482 A1 Oct. 29, 2020

(51) Int. Cl.
| | |
|---|---|
| *G05D 1/02* | (2020.01) |
| *G01S 7/484* | (2006.01) |
| *G01S 7/481* | (2006.01) |
| *G01S 17/89* | (2020.01) |
| *G01S 17/08* | (2006.01) |

(52) U.S. Cl.
CPC ............ *G05D 1/0231* (2013.01); *G01S 7/484* (2013.01); *G01S 7/4815* (2013.01); *G01S 17/08* (2013.01); *G01S 17/89* (2013.01); *G05D 1/0276* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,766,808 | B2* | 7/2014 | Hogasten | H01L 27/14609 |
| | | | | 348/E17.002 |
| 9,869,754 | B1* | 1/2018 | Campbell | G01S 17/10 |
| 2013/0044309 | A1* | 2/2013 | Dakin | G01S 17/89 |
| | | | | 356/4.09 |
| 2013/0044310 | A1* | 2/2013 | Mimeault | G01S 7/487 |
| | | | | 356/5.01 |
| 2018/0059248 | A1* | 3/2018 | O'Keeffe | G01S 7/4817 |
| 2018/0188360 | A1* | 7/2018 | Berger | G01S 17/06 |
| 2018/0275249 | A1* | 9/2018 | Campbell | G01S 17/10 |
| 2018/0284278 | A1* | 10/2018 | Russell | G01S 17/89 |
| 2019/0018107 | A1* | 1/2019 | Warke | G01S 17/36 |
| 2019/0049588 | A1* | 2/2019 | Turbide | G01S 17/08 |
| 2019/0086545 | A1* | 3/2019 | Mooney | G01S 17/88 |
| 2019/0107607 | A1* | 4/2019 | Danziger | G01S 7/4817 |

FOREIGN PATENT DOCUMENTS

| | | | | |
|---|---|---|---|---|
| WO | WO-2009079789 A1 * | 7/2009 | | G01S 17/10 |
| WO | WO-2016087393 A1 * | 6/2016 | | G02B 21/14 |

* cited by examiner

*Primary Examiner* — Jelani A Smith
*Assistant Examiner* — Jacob Daniel Underbakke
(74) *Attorney, Agent, or Firm* — Lorenz & Kopf LLP (57) ABSTRACT

Systems and method are provided for controlling a vehicle. In one embodiment, a method includes: initiating, by a controller onboard the vehicle, a first laser pulse from a first laser device; initiating, by a controller onboard the vehicle, a second laser pulse from a second laser device, wherein the initiating the second laser pulse is based on a phase shift angle; receiving, by the controller onboard the vehicle, first return data and second return data as a result of the first laser pulse and the second laser pulse; interleaving, by the controller onboard the vehicle, the first return pulse and the second return pulse to form a point cloud; and controlling, by the controller onboard the vehicle, the vehicle based on the point cloud.

13 Claims, 6 Drawing Sheets

DYNAMIC LIDAR ALIGNMENT

TECHNICAL FIELD

The present disclosure generally relates to lidar systems, and more particularly relates to systems and methods for lidars of a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, the resolution of data provided by the sensors of the vehicle depends on the sensor's quality and limitations. Limitations of sensor resolution can limit the range of the detection of objects by the sensor. In addition, mechanical mounting and alignment tolerances may not be sufficient to ensure accurate alignment of multiple sensors in a system.

Accordingly, it is desirable to provide improved systems and methods for aligning sensor data and/or sensor systems to improve range and resolution. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: initiating, by a controller onboard the vehicle, a first laser pulse from a first laser device; initiating, by a controller onboard the vehicle, a second laser pulse from a second laser device, wherein the initiating the second laser pulse is based on a phase shift angle; receiving, by the controller onboard the vehicle, first return data and second return data as a result of the first laser pulse and the second laser pulse; interleaving, by the controller onboard the vehicle, the first return pulse and the second return pulse to form a point cloud; and controlling, by the controller onboard the vehicle, the vehicle based on the point cloud. In various embodiments, the first laser device and the second laser device are a same laser device. In various embodiments, the first laser device and the second laser device are different laser devices.

In various embodiments, the method includes determining the phase shift angle based on a desired range. In various embodiments, the method includes determining the desired range based on a detected object within a scene.

In various embodiments, the method includes determining the phase shift angle based on an upcoming scenario.

In various embodiments, the method includes determining the phase shift angle based on location data.

In various embodiments, the method includes determining the phase shift angle based on a position of a mirror device relative to the first laser device.

In various embodiments, the method includes determining the phase shift angle based on a desired power.

In various embodiments, the method includes overlapping the first return pulse and the second return pulse to provide a point cloud with the desired power.

In another embodiment, a method includes: a first lidar device; a second lidar device; and a controller configured to, by a processor, initiate a first pulse from the first lidar device; initiate a second laser pulse from a second lidar device, wherein the initiating the second laser pulse is based on a phase shift angle; receive first return data and second return data as a result of the first laser pulse and the second laser pulse; interleave the first return data and the second return data to form a point cloud; and control the vehicle based on the point cloud.

In various embodiments, the controller is further configured to determine the phase shift angle based on a desired range. In various embodiments, the controller is further configured to determine the desired range based on a detected object within a scene.

In various embodiments, the controller is configured to interleave the first return data and the second return data such that a resolution is increased at the desired range.

In various embodiments, the controller is further configured to determine the phase shift angle based on an upcoming scenario.

In various embodiments, the controller is further configured to determine the phase shift angle based on location data.

In various embodiments, the controller is further configured to determine the phase shift angle based on a position of a mirror device relative to a laser device of the second lidar device.

In various embodiments, the controller is further configured to determine the phase shift angle based on a desired power.

In various embodiments, the controller is further configured to overlap the first return pulse and the second return pulse to provide a point cloud with the desired power.

In various embodiments, the controller is configured to interleave the first return data and the second return data such that a resolution is increased at the desired range, and to overlap the first return pulse and the second return pulse to provide a point cloud with a desired power.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of autonomous operation includes a number of different devices that generate data representative of a scene or environment in a vicinity of the vehicle from different perspectives. A sensing angle of a single sensor or multiple sensors may be altered in order to improve range and/or resolution of sensor data. In this regard, the augmented or enhanced data set may then be analyzed and utilized to determine commands for autonomously operating one or more actuators onboard the vehicle. In this manner, autonomous operation of the vehicle is influenced by the enhanced data sets.

For example, as described in greater detail below in the context of FIGS. 1-5, in exemplary embodiments, a control system shown generally at 100 is associated with a vehicle 10 in accordance with various embodiments. In general, the control system 100 selectively aligns lidar return data from at least two lidar pulses or chirps in order to increase resolution and/or range of detection provided by the final aligned data set.

Figure 1:
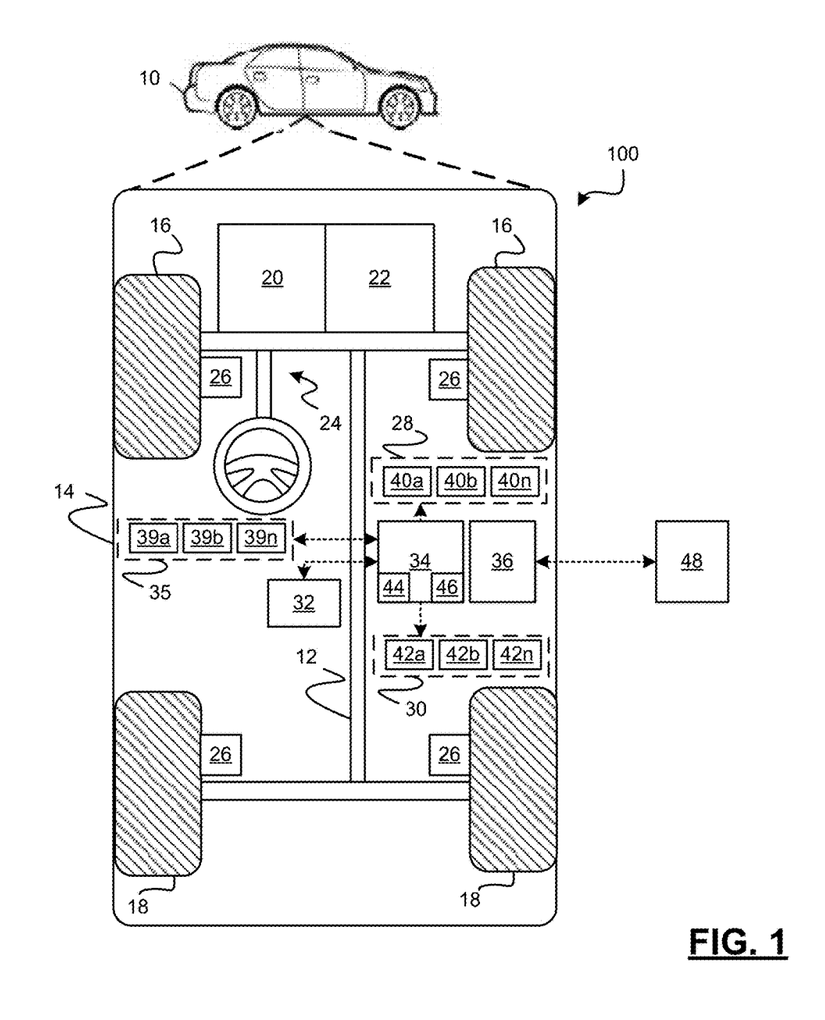
FIG. 1 is a functional block diagram illustrating an autonomous vehicle having a lidar alignment system, in accordance with various embodiments.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, the sensing devices 4040n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. For example, in one embodiment, each lidar device is configured to horizontally rotate and scan 360° (or some other angle) at a frequency of 10 Hertz (Hz).

As used herein, a lidar scan should be understood as referring to a single revolution of a lidar device. In various embodiments, one or more of the lidar devices includes a laser and a mirror that can be selectively controlled.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems described in greater detail below.

Figure 2:
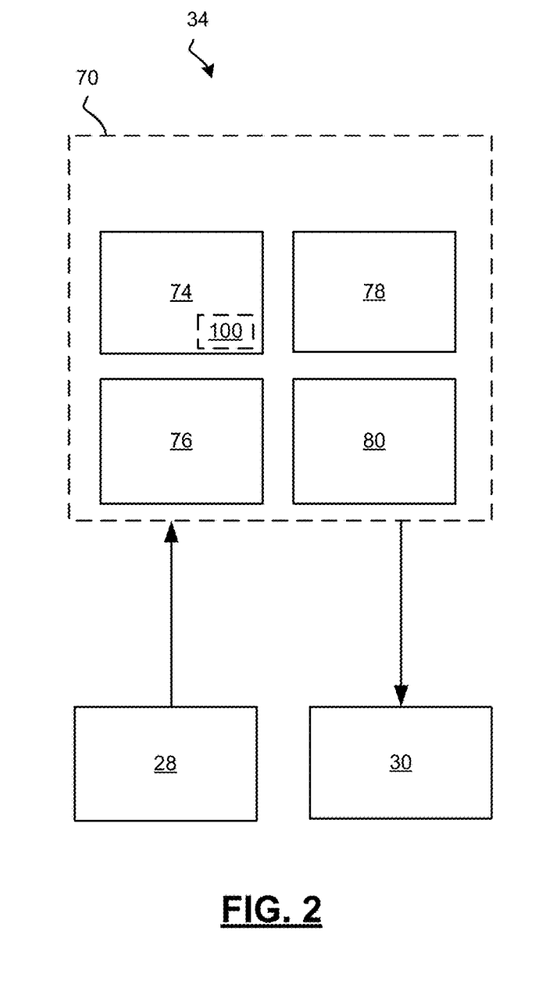
FIG. 2 is a schematic block diagram of an automated driving system (ADS) for a vehicle in accordance with one or more exemplary embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In accordance with various embodiments, the controller 34 implements an autonomous driving system (ADS) 70 as shown in FIG. 2. That is, suitable software and/or hardware components of the controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

Figure 3:
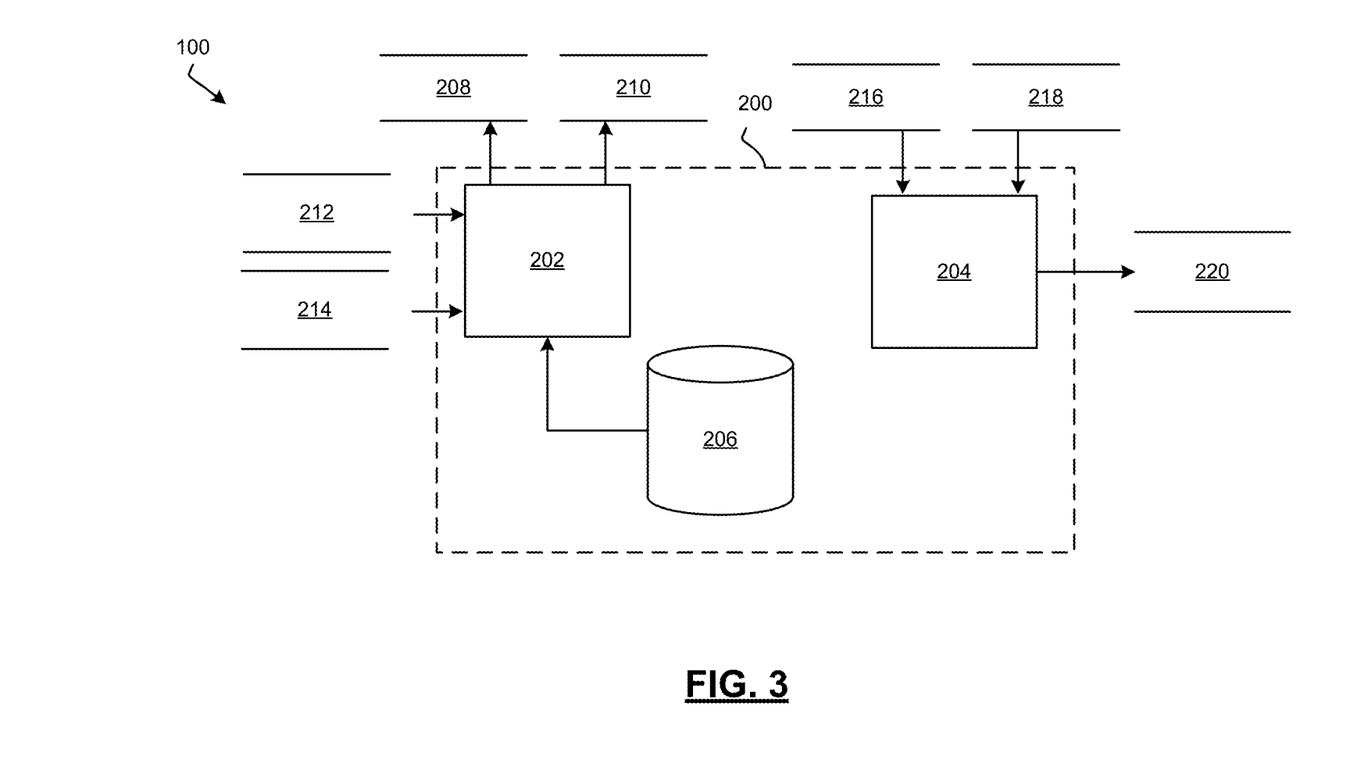
FIG. 3 is a dataflow diagram of a control module of the lidar alignment system in accordance with one or more exemplary embodiments.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

With reference now to FIG. 3 and with continued reference to FIGS. 1 and 2, FIG. 3 depicts an embodiment of a control module 200 of the control system 100 which may be implemented by or incorporated into the controller 34, the processor 44, and/or the computer vision system 74. In various embodiments, the control module 200 may be implemented as one or more sub-modules. As can be appreciated, the sub-modules shown and described may be combined and/or further partitioned in various embodiments. Data inputs to the control module 200 may be received directly from the sensing devices 40a-40n, received from other modules (not shown) of the controller 34, and/or received from other controllers (not shown). In various embodiments, the processing module 200 includes a signal control module 202, a data processing module 204, and a calibration datastore 206.

In various embodiments, the signal control module 202 generates at least two control signals 208, 210. In various embodiments, the control signal 208 is communicated to a first lidar device 40a; and the control signal 210 is communicated to a second lidar device 40b. As can be appreciated, the signal control module 202 can generate any number of control signals to any number of lidar devices, as the two control signals are discussed and described for exemplary purposes only.

In various embodiments, the first lidar device 40a and the second lidar device 40b each include a laser and a mirror (e.g., they are implements as a MEMS scanning device). In various embodiments, the control signals 208, 210 control the lasers. In various other embodiments, the control signals 207, 210 control positioning devices associated with the mirrors. In either embodiment, the control signals 208, 210 are generated to cause the laser to pulse or chirp (hereinafter commonly referred to as pulse) at a time relative to a position of the mirror. This can be done by controlling the laser and/or the mirror.

In various embodiments, the control signals 208, 210 cause the pulse from the second laser 40b to be phase shifted from the pulse from the first laser 40a. By causing the laser to pulse at a time relative to a position of the mirror, the resolution and/or power of the return data from both the first laser device 40a and the second laser device 40b can be improved.

Figure 4:
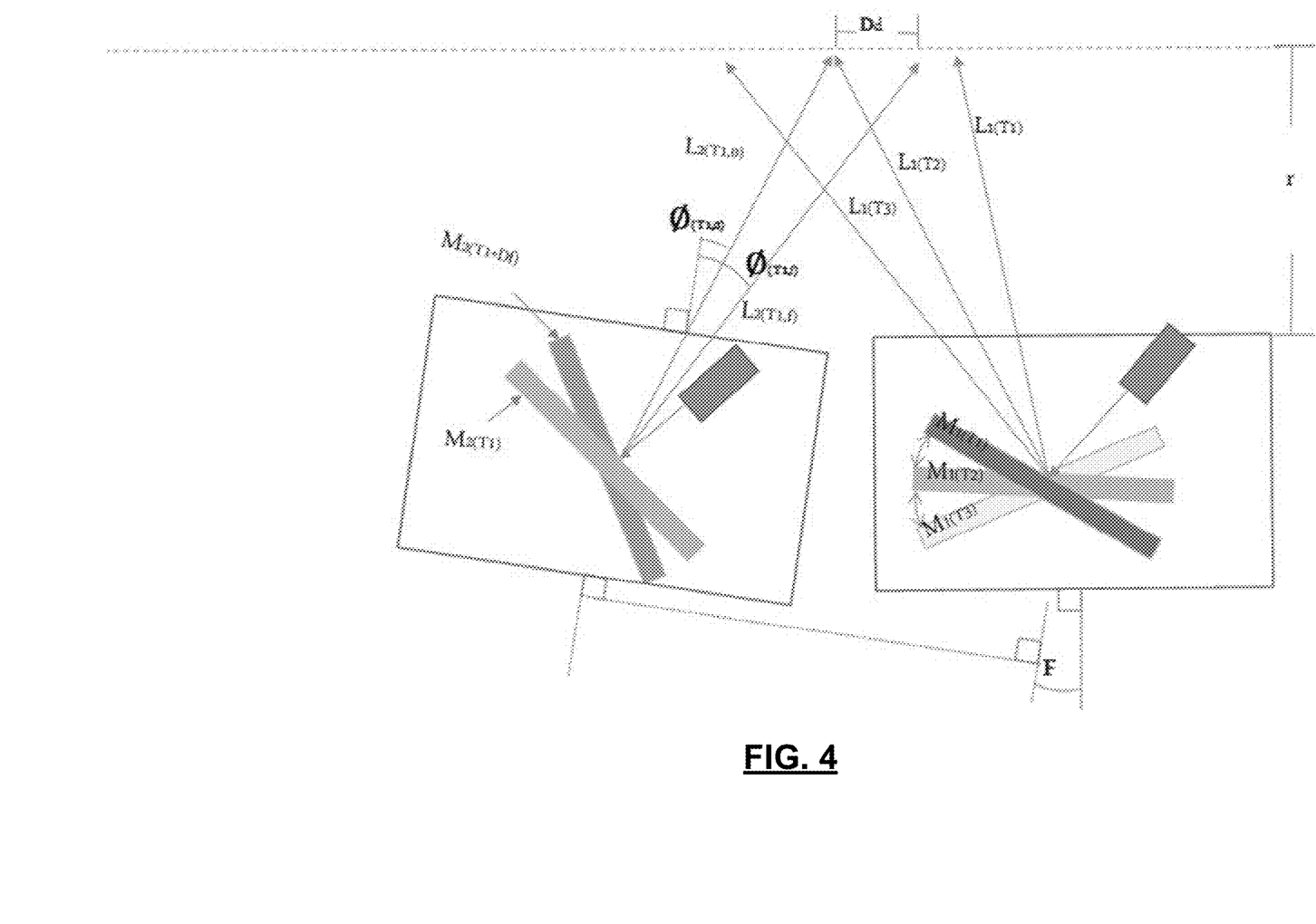
FIG. 4 is illustrating of lidar pulses in accordance with one or more exemplary embodiments.
Figure 5A:
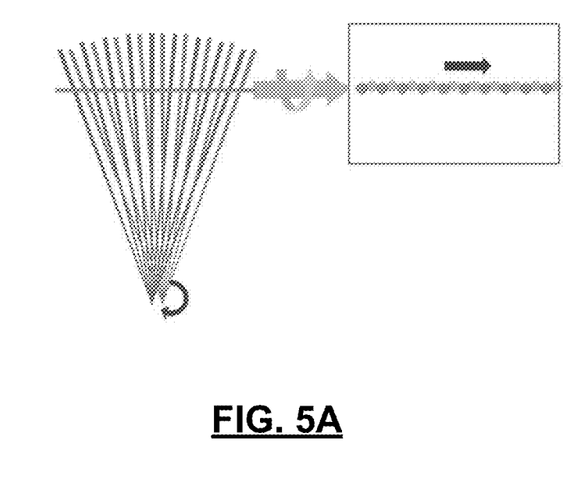
FIGS. 5A and 5B are illustrations of lidar return data in accordance with one or more exemplary embodiments.
Figure 5B:
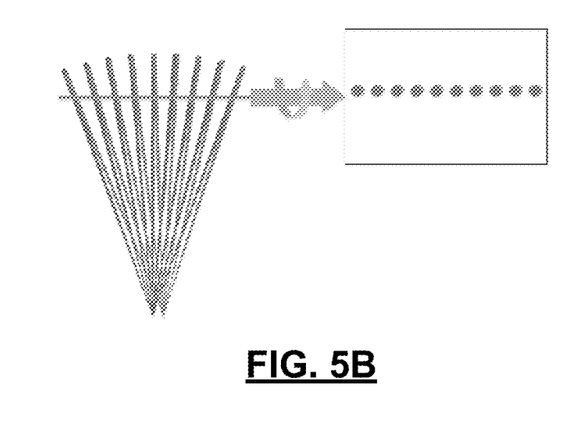

For example, as shown in more detail with regard to FIGS. 4, 5A, and 5B, when a pulse $L_{T1}$ is fired and the mirror position is at $M_{T1}$, the angle $F_1$ results. When a pulse $L_{T2}$ that is phase shifted is fired and the mirror position is at $M_{T2}$, the angle $F_2$ results. The outgoing angle difference $D\theta=\theta 1-\theta 2$, results in a shift of a position d at a range r from a sensing device. This results in the improved resolution $R_2$ at the object range r (FIG. 5A). In addition, when the pulse $L_{T2}$ is not phase shifted, the return data is overlapping (FIG. 5B) at the range r. This results in increased power at the range r.

With reference back to FIG. 3, in various embodiments, the signal control module 202 determines the phase shift and thus the scan angle based on calibration information stored in the calibration datastore 206. In various embodiments, the calibration data includes default values for the phase shift. In various embodiments, the calibration data includes extrinsic mounting locations of the lidar devices 40a, 40b, and intrinsic properties of the lidar devices 40a, 40b. Such calibration information can be used in computing the phase shift. For example, in various embodiments, the signal control module 202 computes the value of the phase shift based on the following equations:

$$\emptyset(t,f)=\emptyset\{M(t),L(t,f)\}. \quad \text{Equation 1:}$$

$$Dd(f,r)=r*(\tan(\emptyset(T1,f)+F)-\tan(\emptyset(T1,0)+F)), 0 > f > F. \quad \text{Equation 2:}$$

Where, Ø is the output angle of the Lidar at time t and phase shift f, M is the scan angle position at time t, L is the laser state at time t and phase shift of f. Dd is the resulting linear shift at a range of r and a phase shift of f F is the period of the laser output. F is the extrinsic mounting angle from the axis of reference.

In various embodiments, the signal control module 202 receives distance data 212 corresponding to a distance to a detected object. In such embodiments, the signal control module 202 determines a phase shift that improves the resolution or power for the desired distance. For such embodiments, Equation 1 and Equation 2 still hold with the distance feeding into the range (r) of these equations.

In various embodiments, the signal control module 202 receives scenario data 214 corresponding to a scenario that the vehicle 10 is approaching (e.g., an intersection, a cross walk, etc.) The signal control module 202 determines the phase shift for a distance that improves the resolution or power for desired for the scenario.

The merge module 204 receives lidar return data 216, 218 and generates point cloud data 220 based thereon. The lidar return data 216, 218 is a result of the return signals from the lidar output generated by lasers. In various embodiments, the merge module 204 generates the point cloud data 208 by interleaving the lidar return data 216, 218, thus improving the resolution as shown in FIG. 5A. In various embodiments, the merge module 204 generates the point cloud data 220 by overlapping the lidar return data 216, 218 from the two or more signal pulses, thus improving the power as shown in FIG. 5B. The point cloud data 220 may then be used by other systems for further analysis and to control the vehicle 10.

Figure 6:
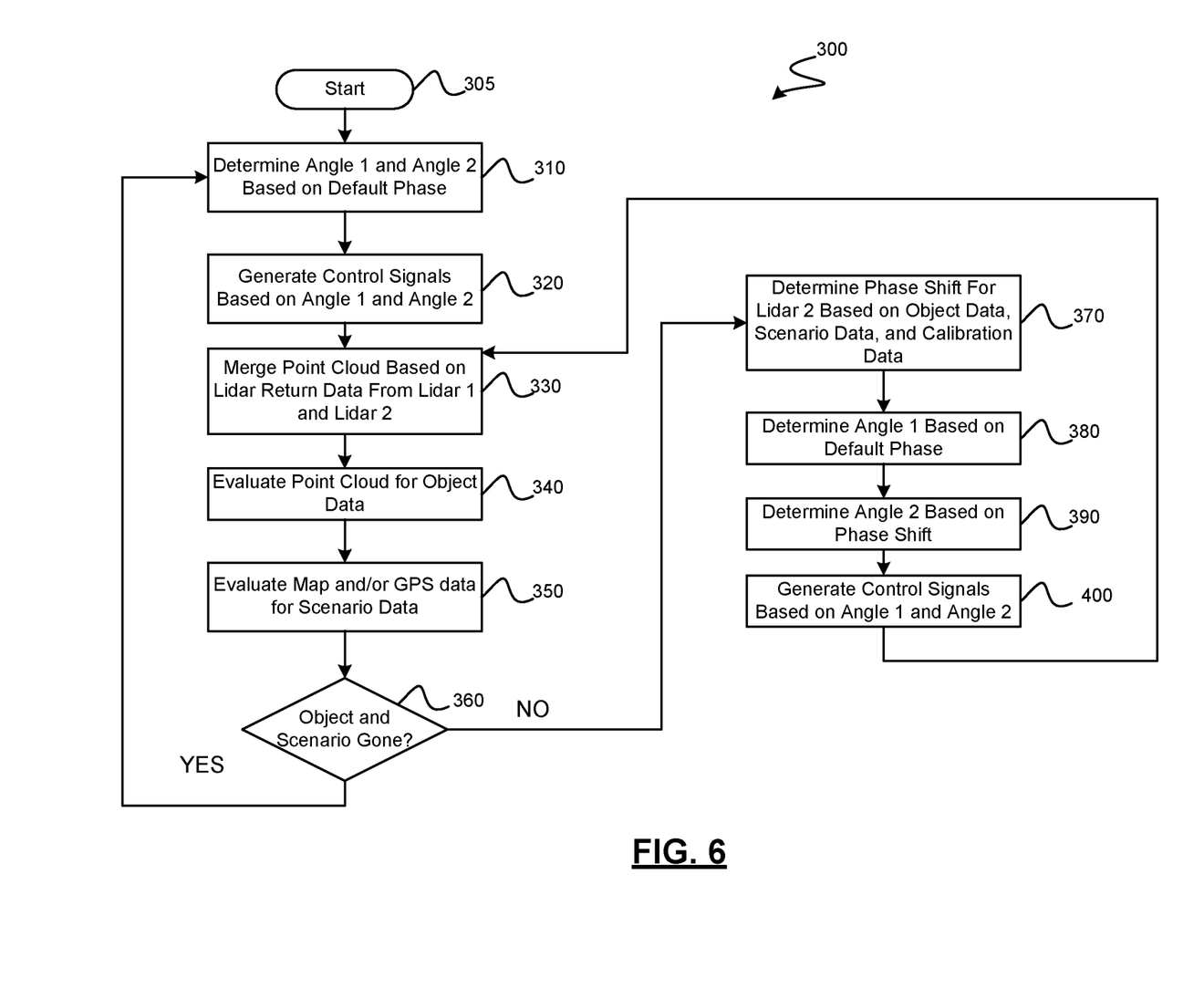
FIG. 6 is a flowchart illustrating a lidar alignment method in accordance with one or more exemplary embodiments.

Referring now to FIG. 6, and with continued reference to FIGS. 1-5, a flowchart illustrates various embodiments of a process 300 which may be embedded within a controller 34 in the control system 100 of FIG. 1 supporting the ADS 70 and the control module 200 of FIG. 3 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the process 300 can be scheduled to run based on one or more predetermined events, and/or can run continuously during operation of the vehicle 10.

In one example, the method may begin at 305. The angle 1 and the angle 2 are determined according to a default phase at 310. The control signals 208, 210 are generated to control the lidar devices 40a, 40b according to the angles 1 and 2 at 320. The return data 216, 218 from the lidar devices 40a, 40b is received and merged into point cloud data 220 at 330. The point cloud data 220 is evaluated, for example by a perception system, to determine the object data 212 at 340. Map data, GPS data, and/or localization data may be evaluated to determine the scenario data 214 at 350. If an object and a scenario are gone or are not identified at 360, the process 300 continues with controlling the lidar devices 40a, 40b based on the default phase at 310.

If, however, an object or a scenario is identified that would benefit from improved resolution or power, the process 300 determines the phase shift for the second lidar device 40b based on the object data 212, the scenario data 214, and/or calibration data at 370. The angle for the first lidar device 40a is determined based on the default phase at 380. The angle for the second lidar device 40b is determined based on the phase shift at 390. Thereafter, the control signals 208, 210 are generated based on the first angle and the second angle at 400. Thereafter, the process 300 continues with evaluating the return data 216, 218 at 330. As can be appreciated, the process 300 may continue as long as the lidar devices 40a, 40b are in operation. Thus, the process 300 may end once one or more of the lidar devices 40a, 40b are not operating.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
    determining, by a controller onboard the vehicle, a first phase shift angle based on a desired power of lidar data and determining a second phase shift angle based on a desired resolution of lidar data, wherein the desired power and the desired resolution are associated with a desired range from a first laser device;
    initiating, by the controller onboard the vehicle, a first set of laser pulses from the first laser device based the first phase shift angle;
    initiating, by a controller onboard the vehicle, a second set of laser pulses from a second laser device based on the second phase shift angle;
    receiving, by the controller onboard the vehicle, first return data and second return data as a result of the first laser pulse and the second laser pulse;
    when the phase shift angle is determined based on the desired resolution, interleaving, by the controller onboard the vehicle, the second return data to form a point cloud with the desired resolution of the lidar data;
    when the phase shift angle is determined based on the desired power, overlapping, by the controller onboard the vehicle, the first return data to form the point cloud with the desired power of the lidar data; and
    controlling, by the controller onboard the vehicle, the vehicle based on the point cloud.

2. The method of claim 1, wherein the first laser device and the second laser device are a same laser device.

3. The method of claim 1, wherein the first laser device and the second laser device are different laser devices.

4. The method of claim 1, further comprising determining the desired range based on a detected object within a scene.

5. The method of claim 1, further comprising determining the phase shift angle based on an upcoming scenario of a roadway that the vehicle is approaching.

6. The method of claim 1, further comprising determining the phase shift angle based on location data associated with at least one of the first laser device and the second laser device.

7. The method of claim 1, further comprising determining the phase shift angle based on a position of a mirror device relative to the first laser device.

8. A vehicle, comprising:
    a first lidar device;
    a second lidar device; and
    a controller configured to, by a processor: determine a first phase shift angle based on a desired power of lidar data and determine a second phase shift angle based on a desired resolution of the lidar data, wherein the desired power and the desired resolution are associated with a desired range from the first laser device; initiate a first set of pulses from the first lidar device based on the first phase shift angle; initiate a second set of laser pulses from the second lidar device based on the second phase shift angle; receive first return data and second return data as a result of the first set of laser pulses and the second set of laser pulses; when the phase shift angle is determined based on the desired resolution of the lidar data, interleave the second return data to form a point cloud, when the phase shift angle is determined based on the desired power, overlap the first return pulse to form the point cloud with the desired power of the lidar data; and control the vehicle based on the point cloud.

9. The system of claim 8, wherein the controller is further configured to determine the desired range based on a detected object within a scene.

10. The system of claim 9, wherein the controller is configured to interleave the first return data and the second return data such that a resolution of return data is increased at the desired range from the first laser device.

11. The system of claim 8, wherein the controller is further configured to determine the phase shift angle based on an upcoming scenario of a roadway that the vehicle is approaching.

12. The system of claim 8, wherein the controller is further configured to determine the phase shift angle based on location data associated with at least one of the first laser device and the second laser device.

13. The system of claim 8, wherein the controller is further configured to determine the phase shift angle based on a position of a mirror device relative to a laser device of the second lidar device.

* * * * *